US005262077A

United States Patent [19]

Bivens et al.

[11] Patent Number: 5,262,077

[45] Date of Patent: Nov. 16, 1993

[54] HALOCARBON BLENDS

[75] Inventors: Donald B. Bivens, Kennett Square; Brooks S. Lunger, Coatesville, both of Pa.

[73] Assignee: E. I. Du Pont de Nemours and Company, Wilmington, Del.

[21] Appl. No.: 725,106

[22] Filed: Jul. 3, 1991

Related U.S. Application Data

[63] Continuation-in-part of Ser. No. 520,254, Apr. 25, 1990, abandoned.

[51] Int. Cl.$^5$ .......................... C09K 5/04; C09K 3/30; C08J 9/14; H01B 3/56

[52] U.S. Cl. ....................................... 252/67; 60/651; 62/114; 174/176 F; 174/25 G; 252/2; 252/8; 252/162; 252/172; 252/305; 252/364; 252/571; 252/DIG. 9; 264/53; 264/DIG. 5; 521/98; 521/131

[58] Field of Search ............... 252/162, 172, 364, 305, 252/DIG. 9, 67, 69, 8, 571; 62/114; 60/651; 174/17 GF, 25 G; 264/53, DIG. 5; 521/98, 131

[56] References Cited

U.S. PATENT DOCUMENTS

| | | | |
|---|---|---|---|
| 3,819,493 | 6/1974 | Fozzard | 203/70 |
| 4,198,313 | 4/1980 | Barqiqia | 252/90 |
| 4,530,773 | 7/1985 | Enjo et al. | 252/69 |
| 4,810,403 | 3/1989 | Bivens et al. | 252/67 |
| 4,945,119 | 7/1990 | Smits et al. | 252/182.24 |
| 4,957,625 | 9/1990 | Tamura et al. | 252/67 |
| 4,972,003 | 11/1990 | Grunbauer et al. | 521/131 |

FOREIGN PATENT DOCUMENTS

| | | |
|---|---|---|
| 345580 | 12/1989 | European Pat. Off. . |
| 384371 | 8/1990 | European Pat. Off. . |
| 430170 | 6/1991 | European Pat. Off. . |
| 63-308084 | 12/1988 | Japan . |
| 1-108291 | 4/1989 | Japan . |
| 91/14751 | 10/1991 | World Int. Prop. O. . |

*Primary Examiner*—Linda Skaling
*Attorney, Agent, or Firm*—James E. Shipley

[57] ABSTRACT

Azeotrope-like blends are disclosed comprising effective amounts of 1,1,1,2-tetrafluoroethane (HFC-134a), 1,1-difluoroethane (HFC-152a) and a halocarbon selected from the group consisting of 2-chloro-1,1,1,2-tetrafluoroethane (HCFC-124), 2-chloro-1,1,2,2-tetrafluoroethane (HCFC-124a), 1-hydroperfluoropropane (HFC-227ca), 2-hydroperfluoropropane (HFC-227ea), and mixtures thereof.

15 Claims, No Drawings

HALOCARBON BLENDS

CROSS REFERENCE TO RELATED APPLICATION

This application is a continuation-in-part of application Ser. No. 07/520,254 filed Apr. 25, 1990, now abandoned.

BACKGROUND OF THE INVENTION

This invention relates to specific ternary, quaternary and pentanary halocarbon blends as described herein. Such blends are useful as refrigerants, heat transfer media, fire extinguishing agents, gaseous dielectrics, expansion agents, aerosol propellants and power cycle working fluids. These blends are potentially environmentally safe substitutes for dichlorodifluoromethane (CFC-12).

In refrigeration applications, and more specifically, in automobile air conditioning systems, refrigerant may be released to the atmosphere through leaks, such as through shaft seals, hose connections, solder joints, etc. Additionally, refrigerant may also be released to the atmosphere during equipment repair and equipment damage, such as automobile accidents.

Worldwide concern about stratospheric ozone depletion has resulted in a concerted search for alternative compounds which have lower ozone depletion potentials than CFC-12 which is the most widely used refrigerant. Its future use is expected to be reduced significantly because of its relatively high ozone depletion potential.

Most currently produced commercial refrigerants are either pure fluids or azeotropes. Many of these refrigerants have ozone depletion potentials.

Some nonazeotropic mixtures may also be used as refrigerants but they have the disadvantage of fractionating when a portion of the refrigerant charge is leaked or discharged to the atmosphere. Should these nonazeotropic mixtures contain a flammable component, they could either become flammable themselves or release a flammable component to the atmosphere. Refrigeration equipment operation could be affected adversely because of compositional and vapor pressure changes.

What is needed, therefore, are substitute refrigerant blends which maintain refrigerant properties over wide compositional ranges, and also have significantly reduced ozone depletion potentials.

SUMMARY OF THE INVENTION

According to the present invention, azeotrope-like blends have been discovered comprising effective amounts of 1,1,1,2-tetrafluoroethane (HFC-134a), 1,1-difluoroethane (HFC-152a) and a halocarbon selected from the group consisting of 2-chloro-1,1,1,2-tetrafluoroethane (HCFC-124), 2-chloro-1,1,2,2-tetrafluoroethane (HCFC-124a), the monohydroperfluoropropanes 1-hydroperfluoropropane (HFC-227ca), and 2-hydroperfluoropropane (HFC-227ea), and mixtures thereof.

The azeotrope-like blends of the instant invention may be admixtures of about 40 to 60 weight percent 1,1,1,2-tetrafluoroethane, about 2 to 40 weight percent 1,2-difluoroethane and about 2 to 40 weight percent of a halocarbon selected from the group consisting of 2-chloro-1,1,1,2-tetrafluoroethane (HCFC-124), 2-chloro-1,1,2,2-tetrafluoroethane (HCFC-124a), monohydroperfluoropropane (HFC-227), and mixtures thereof. The component proportions being chosen such that the resulting blends have vapor pressures substantially equal to the vapor pressure of dichlorodifluoromethane (CFC-12), over the temperature range of about 0° C. to 100° C. All of the aforedescribed azeotrope-like blends have substantially lower ozone depletion potentials than CFC-12.

The novel azeotrope-like blends may be used to produce refrigeration by condensing the blend and thereafter evaporating the condensate in the vicinity of a body to be cooled.

The novel azeotrope-like blends may also be used to produce heat by condensing the blend in the vicinity of the body to be heated and thereafter evaporating the condensate.

The novel azeotrope-like blends may also be used as heat transfer media, fire extinguishing agents, gaseous dielectrics, expansion agents, aerosol propellants and power cycle working fluids.

The use of azeotrope-like blends minimizes the problem of component fractionation and handling in system operations because azeotrope-like blends behave essentially as single substances. Many of the novel, azeotrope-like blends also offer the advantage of being nonflammable.

DETAILED DESCRIPTION OF THE INVENTION

By "azeotrope-like blend" is meant an admixture of three or more compounds, which admixture behaves essentially as a single compound, in that the vapor pressure of the admixture remains substantially unchanged during evaporation of about 50 weight percent of the original admixture. In other words, the residual admixture after substantial evaporation maintains essentially the same vapor pressure as the original admixture, i.e., the admixture evaporates without substantial vapor pressure change.

By "vapor pressure of the admixture remaining substantially unchanged during evaporation of about 50 weight percent of the original admixture" is meant that the vapor pressure during about 50 weight percent evaporation does not decline more than 10% from the vapor pressure of the starting admixture.

By "effective amount" is meant the amount of each component of the instant invention admixture, which when combined, results in the formation of the azeotrope-like blends of the instant invention.

By "refrigerant" is meant the substance which undergoes physical change in heat transfer applications.

By "ozone depletion potential" is meant the ratio of the calculated ozone depletion in the stratosphere which results from the emission of a compound compared to the ozone depletion potential which results from the same emission rate as trichlorofluoromethane (CFC-11) which is set at 1.0. A method of calculating ozone depletion potential is described in: "The Relative Efficiency of a Number of Halocarbons for Destroying Stratospheric Ozone", by D. J. Wuebbles, Lawrence Livermore Laboratory Report UCID-18924, January, 1981 and "Chlorofluorocarbon Emission Scenarios: Potential Impact on Stratospheric Ozone", by D. J. Wuebbles, Journal Geophysics Research, 88, 1433–1443, 1983.

By "nonflammable" is meant, a gas mixture in air will not burn when subjected to a spark igniter, as described in "Limits of Flammability of Gases and Vapours", Bulletin 503, H. F. Coward et al., U.S. Bureau of Mines, Washington, D.C., 1952.

By "substantially equal to the vapor pressure of dichlorodifluoromethane (CFC-12)" is meant, a vapor pressure which is about ±25 percent of the vapor pressure of dichlorodifluoromethane at the same temperature over the temperature range of about 0° C. to about 100° C. The vapor pressure of dichlorodifluoromethane is described in the "Handbook of Chemistry and Physics", 50th Ed., page D-163.

By "substantially lower ozone depletion potential than the ozone depletion potential of dichlorodifluoromethane" is meant an ozone depletion potential at least fifty percent less than the ozone depletion potential of dichlorodifluoromethane.

This invention provides azeotrope-like blends which have vapor pressure/temperature relationships substantially equal to the vapor pressure of dichlorodifluoromethane (CFC-12). Additionally, the azeotrope-like blends of the instant invention retain a close match to the CFC-12 vapor pressure/temperature relationship, even after substantial evaporation losses of about 50 weight percent of the original charge. A vapor pressure/temperature relationship similar to that of CFC-12 is particularly desirable because existing refrigeration equipment, originally designed for CFC-12 use, can also be used with the azeotrope-like blends described herein, with little or no modification. The vapor pressure of the admixtures of the instant invention remain substantially unchanged during evaporation of about 50 weight percent of the original admixture.

The azeotrope-like blends of the instant invention comprise admixtures of effective amounts of 1,1,1,2-tetrafluoroethane ($CF_3$—$CH_2F$, boiling point = −26.5° C.) and 1,1-difluoroethane ($CF_2H$—$CH_3$, boiling point = −24.7° C.) and a halocarbon selected from the group consisting of 2-chloro-1,1,1,2-tetrafluoroethane ($CF_3$—CHClF, boiling point = −12° C.), 2-chloro-1,1,2,2-tetrafluoroethane ($CF_2H$—$CF_2Cl$, boiling point = −10.2° C.), 1-hydroperfluoropropane ($CF_3$—$CF_2$—$CHF_2$, boiling point = −17° C.), and 2-hydroperfluoropropane ($CF_3$—CHF—$CF_3$, boiling point = −18° C.).

The present invention also provides azeotrope-like blends, whose ozone depletion potentials are significantly lower than that of dichlorodifluoromethane.

The present invention also provides a series of azeotrope-like blends, many of which are nonflammable.

The azeotrope-like blends of the instant invention can be prepared by any convenient method including mixing or combining the desired component amounts. A preferred method is to weigh the desired component amounts and thereafter combine them in an appropriate container.

The azeotrope-like blends described in this invention may have the following compositions: about 40 to 60 weight percent 1,1,1,2-tetrafluoroethane, about 2 to 40 weight percent 1,2-difluoroethane and about 2 to 40 weight percent of a halocarbon selected from the group consisting of 2-chloro-1,1,1,2-tetrafluoroethane (HCFC-124), 2-chloro-1,1,2,2-tetrafluoroethane (HCFC-124a), 1-hydroperfluoropropane (HFC-227ca), 2-hydroperfluoropropane (HFC-227ea), and mixtures thereof.

The azeotrope-like blends described in this invention may have the following preferred compositions: about 40 to 60 weight percent 1,1,1,2-tetrafluoroethane, about 2 to 40 weight percent 1,2-difluoroethane and about 2 to 40 weight percent of a halocarbon selected from the group consisting of 2-chloro-1,1,1,2-tetrafluoroethane (HCFC-124), 2-chloro-1,1,2,2-tetrafluoroethane (HCFC-124a), 1-hydroperfluoropropane (HFC-227ca), 2-hydroperfluoropropane (HFC-227ea), and mixtures thereof.

The azeotrope-like blends described in this invention may have the following more preferred compositions:

About 50 weight percent 1,1,1,2-tetrafluoroethane, about 25 weight percent 1,1-difluoroethane and about 25 weight percent 2-chloro-1,1,1,2-tetrafluoroethane.

About 50 weight percent 1,1,1,2-tetrafluoroethane, about 25 weight percent 1,1-difluoroethane and about 25 weight percent 2-chloro-1,1,2,2-tetrafluoroethane.

About 50 weight percent 1,1,1,2-tetrafluoroethane, about 25 weight percent 1,1-difluoroethane and about 25 weight percent monohydroperfluoropropane.

About 50 weight percent 1,1,1,2-tetrafluoroethane, about 25 weight percent 1,1-difluoroethane and about 25 weight percent 2-hydroperfluoropropane.

About 50 weight percent 1,1,1,2-tetrafluoroethane, about 25 weight percent 1,1-difluoroethane, about 12.5 weight percent 2-chloro-1,1,1,2-tetrafluoroethane and about 12.5 weight percent 2-hydroperfluoropropane.

The azeotrope-like blends described in this invention may have the following most preferred composition: about 55 weight percent 1,1,1,2-tetrafluoroethane, about 20 weight percent 1,1-difluoroethane and about 25 weight percent 2-chloro-1,1,1,2-tetrafluoroethane.

Specific examples of the present invention will now be set forth. Unless otherwise stated, all percentages are by weight. It is to be understood that these examples are merely illustrative and are in no way to be interpreted as limiting the scope of this invention.

EXAMPLE 1

| | Vapor Pressure At 25° C., psia Amount Evaporated | | |
|---|---|---|---|
| Refrigerant Blends | 0 wt % | 50 wt % | % Change |
| 1. CFC-12 | 94.5 | 94.5 | 0.0 |
| 2. (40% + 20% + 40%) HCFC-22/HFC-152a/CFC-114 | 99.5 | 89.5 | 10.0 |
| 3. (36% + 24% + 40%) HCFC-22/HFC-152a/HCFC-124 | 95.1 | 86.0 | 9.6 |
| 4. (50% + 25% + 25%) HFC-134a/HFC-152a/HCFC-124 | 86.4 | 84.2 | 2.5 |
| 5. (60% + 15% + 25%) HFC-134a/HFC-152a/HCFC-124 | 88.2 | 86.0 | 2.5 |
| 6. (50% + 25% + 25%) HFC-134a/HFC-152a/HCFC-124a | 85.1 | 83.2 | 2.2 |
| 7. (50% + 25% + 25%) HFC-134a/HFC-152a/HFC-227ca | | (*) | |
| 8. (50% + 25% + 25%) HFC-134a/HFC-152a/HFC-227ea | 92.3 | 91.8 | 0.5 |
| 9. (50% + 25% + 12.5% + 12.5%) HFC-134a/HFC-152a/HCFC-124/HFC-227ea | 89.1 | 87.6 | 1.5 |

(*)The azeotrope-like blend described here is expected to perform identically to the blend below it, which contains the HFC-227ea isomer, the boiling points being only 1° C. apart.
HCFC-22 = chlorodifluoromethane Example 1 demonstrates that all of the azeotrope-like blends of the instant invention exhibit very small vapor pressure changes of about 2.5% or less during 50 weight percent evaporation of the total blend. The vapor pressure versus leak behavior of these blends approximates very closely that of neat CFC-12. Vapor pressure performance, after partial blend evaporation, indicates that all of the aforementioned blends would essentially maintain their vapor pressures, even after 50 percent of the blend was lost.

This Example also demonstrates that the azeotrope-like blends described in the instant invention, which contain both HFC-134a and HFC-152a, exhibit lower vapor pressure changes than do the ternary blends described in U.S. Pat. No. 4,810,403, which contain both HCFC-22 and HFC-152a. The blends of the instant invention are, surprisingly, more azeotrope-like and therefore better refrigerant candidates than those cited in the aforementioned patent. By comparison Example 1 of U.S. Pat. No. 4,810,403 after a 53% vapor leakage reports a vapor pressure drop from 98 psia at 23.5° C. to 87 psia at 22.8° C. which can be calculated to be 11.2%.

EXAMPLE 2

| Refrigerant Blends | Refrigerant Performance(*) | | | | |
|---|---|---|---|---|---|
| | (d) COP | Capacity BTU/MIN | Comp. Exit P, PSIA | T °F. | (a) T. °F. |
| 1. CFC-12 | 1.79 | 125.2 | 388 | 221 | — |
| 2. HFC-134a | 1.50 | 106.0 | 444 | 213 | — |
| 3. (40% + 20% + 40%) HCFC-22/HFC-152a/CFC-114 | 1.78 | 121.9 | 405 | 231 | 7.7 |
| 4. (36% + 24% + 40%) HCFC-22/HFC-152a/HCFC-124 | 1.90 | 130.8 | 404 | 240 | 4.2 |
| 5. (50% + 25% + 25%) HFC-134a/HFC-152a/HCFC-124 | 1.77 | 111.4 | 388 | 221 | 1.3 |
| 6. (60% + 15% + 25%) HFC-134a/HFC-152a/HCFC-124 | 1.63 | 104.0 | 395 | 217 | 1.2 |
| 7. (50% + 25% + 25%) HFC-134a/HFC-152a/HCFC-124a | | | (b) | | |
| 8. (50% + 25% + 25%) HFC-134A/HFC-152A/HFC-227ca | | | (c) | | |
| 9. (50% + 25% + 25%) HFC-134a/HFC-152a/HFC-227ea | 1.36 | 88.1 | 399 | 214 | 0.4 |
| 10. (50% + 25% + 12.5% + 12.5%) HFC-134a/HFC-152a/HCFC-124/HFC-227ea | 1.58 | 101.4 | 398 | 219 | 0.8 |

(*)Refrigeration test conditions were: Condenser temperature = 190° F.; Evaporator temperature = 40° F.; Superheat = 10° F.; Subcooling = 10° F.; Compressor displacement = 3.5 $ft^3$/min.
(a) T is the temperature differential between dew point and bubble point temperatures at the condenser.
(b) The azeotrope-like blend described here is expected to perform identically to the blend which contains the HCFC-124 isomer.
(c) The azeotrope-like blend described here is expected to perform identically to the blend which contains the HFC-227ea isomer.
(d) COP is Coefficient of Performance, a measure of energy efficiency.

These data suggest that the refrigeration performance of the multi-component, azeotrope-like blends, which contain HFC-134a, compare quite favorably with CFC-12, and appear to be considerably better than HFC-134a, the proposed automotive replacement refrigerant, with respect to compressor discharge pressure.

Example 2 also demonstrates that the azeotrope-like blends described in the instant invention, which contain both HFC-134a and HFC-152a, exhibit lower condenser temperature differentials than do the ternary blends described in U.S. Pat. No. 4,810,403, which contain both HCFC-22 and HFC-152a. Again, these data demonstrate that the blends of the instant invention are more azeotrope-like and therefore better refrigerant candidates than those cited in the aforementioned patent.

EXAMPLE 3

AUTOMOTIVE AIR CONDITIONER WIND TUNNEL TESTS

| Performance Comparison Between HFC-134a and CFC-12 | | |
|---|---|---|
| Interior Temperature | | |
| Pulldown | Slightly slower | |
| Normal Speeds | +1 to 2° F. | |
| Idle | +4 to 6° F. | |
| Compressor Suction: | Pressure, psig | Temperature, °F. |
| Normal Speeds | Same | +2 to 4 |
| Idle | +10 to 15 | +5 to 10 |
| Compressor Discharge: | Pressure, psig | Temperature, °F. |
| Normal Speeds | +20 to 25 | −13 to −15 |
| Idle | +75 to 80 | −8 to −10 |
| Performance Comparison Between HFC-134a/HFC-152a/HCFC-124(50.0 + 25.0 + 25.0) and CFC-12 | | |
| Interior Temperature | | |
| Pulldown | Same | |
| Normal Speeds | +1.2° F. | |
| Idle | +2.6° F. | |
| Compressor Suction: | Pressure, psig | Temperature, °F. |
| Normal Speeds | Same | −5 |
| Idle | Same | −5 |
| Compressor Discharge: | Pressure, psig | Temperature, °F. |
| Normal Speeds | −9 | −13 |
| Idle | −5 | −14 |

These data demonstrate that the azeotrope-like blend cited above performs surprising better in automotive air conditioners than the proposed substitute refrigerant, 1,1,1,2-tetrafluoroethane (HFC-134a). The ternary blend provides unexpectedly better cooling, and most importantly, has compressor discharge pressures which are 30 to 85 psig lower than HFC-134a. The higher compressor discharge pressures associated with HFC-134a necessitate expensive equipment redesign, whereas, by using the azeotrope-like blend cited, no equipment modification would be required for pressure considerations.

Examples 2 and 3 above report the surprising performance of the blend of 134a/152a/124 in comparison with 134a and CFC-12. It was surprising that the blend gave better cooling performance than 134a and also had significantly lower compressor discharge pressures. This means that there are fundamental differences in the thermophysical properties of 134a and the blend of 134a/152a/124, and the differences were not obvious to those working in this field.

EXAMPLE 4

| Refrigerant Blends | Ozone Depletion Potentials |
|---|---|
| 1. CFC-12 | 1.00 |
| 2. (40% + 20% + 40%) HCFC-22/HFC-152a/CFC-114 | 0.40 |
| 3. (36% + 24% + 40%) HCFC-22/HFC-152a/HCFC-124 | 0.09 |
| 4. (50% + 25% + 25%) HFC-134a/HFC-152a/HCFC-124 | 0.05 |
| 5. (50% + 25% + 25%) HFC-134a/HFC-152a/HCFC-124a | 0.05 |
| 6. (50% + 25% + 25%) HFC-134a/HFC-152a/HFC-227ca | 0.00 |
| 7. (50% + 25% + 25%) HFC-134a/HFC-152a/HFC-227ea | 0.00 |
| 8. (50% + 25% + 12.5% + 12.5%) HFC-134a/HFC-152a/HCFC-124/ HFC-227ea | 0.03 |

These data demonstrate that all of the azeotrope-like blends of the instant invention exhibit substantially lower ozone depletion potentials than dichlorodifluoromethane (CFC-12).

Example 4 also demonstrates that the azeotrope-like blends described in this invention, which contain both HFC-134a and HFC152a, also exhibit lower ozone depletion potentials than do the ternary blends described in U.S. Pat. No. 4,810,403, which contain both HCFC-22 and HFC-152a.

We claim:

1. A composition consisting essentially of an azeotrope-like blend consisting of 40 to 60 weight percent of 1,1,1,2-tetrafluoroethane, 2 to 40 weight percent of 1,1-difluoroethane and 2 to 40 weight percent of a halocarbon selected from the group consisting of 2-chloro-1,1,1,2-tetrafluoroethane, 2-chloro-1,1,2,2-tetrafluoroethane, monohydroperfluoropropane, and mixtures of 2-chloro-1,1,2,2-tetrafluoroethane and 2-hydroperfluoropropane said blend having an initial vapor pressure substantially equal to the vapor pressure of dichlorodifluoromethane over the temperature range of about 0° C. to 100° C., and wherein said vapor pressure does not decline more than 10% during evaporation of up to about 50 weight percent of the original blend.

2. The azeotrope-like blend of claim 1 wherein the halocarbon is 2-chloro-1,1,1,2-tetrafluoroethane.

3. The azeotrope-like blend of claim 1 wherein the halocarbon is 2-chloro-1,1,2,2-tetrafluoroethane.

4. The azeotrope-like blend of claim 1 wherein the halocarbon is monohydroperfluoropropane.

5. The azeotrope-like blend of claim 4 wherein the monohydroperfluoropropane is 2-hydroperfluoropropane.

6. The azeotrope-like blend of claim 1 wherein the halocarbon is an admixture of 2-chloro-1,1,1,2-tetrafluoroethane and 2-hydroperfluoropropane.

7. The azeotrope-like blend of claim 1 wherein about 50 weight percent 1,1,1,2-tetrafluoroethane, about 25 weight percent 1,1,-difluoroethane and about 25 weight percent 2-chloro-1,1,1,2-tetrafluoroethane as present.

8. The azeotrope-like blend of claim 1 wherein about 55 weight percent 1,1,1,2-tetrafluoroethane, about 20 weight percent 1,1-difluoroethane and about 25 weight percent 2-chloro-1,1,1,2-tetrafluoroethane are present.

9. The azeotrope-like blend of claim 1 wherein about 60 weight percent 1,1,1,2- tetrafluoroethane, about 15 weight percent 1,1-difluoroethane and about 25 weight percent 2-chloro-1,1,1,2-tetrafluoroethane are present.

10. The azeotrope-like blend of claim 1 wherein about 50 weight percent 1,1,1,2-tetrafluoroethane, about 25 weight percent 1,1,difluoroethane and about 25 weight percent 2-chloro-1,1,2,2-tetrafluoroethane are present.

11. The azeotrope-like blend of claim 1 wherein about 50 weight percent 1,1,1,2-tetrafluoroethane, about 25 weight percent 1,1-difluoroethane and about 25 weight percent monohydroperfluoropropane are present.

12. The azeotrope-like blend of claim 11 wherein the monohydroperfluoropropane is 2-hydroperfluoropropane.

13. The azeotrope-like blend of claim 1, wherein about 50 weight percent 1,1,1,2-tetrafluoroethane, about 25 weight percent 1,1-difluoroethane, about 12.5 weight percent 2-chloro-1,1,1,2-tetrafluoroethane and about 12.5 weight percent 2-hydroperfluoropropane are present.

14. A method for producing cooling which comprises evaporating the composition of claim 1 in the vicinity of a body to be cooled.

15. A method for producing heating which comprises condensing the composition of claim 1 in the vicinity of the body to be heated.

* * * * *